United States Patent Office 3,798,170
Patented Mar. 19, 1974

3,798,170
STABILIZED METHYLCHLOROFORM
COMPOSITIONS
Wilbur H. Petering, Detroit, Mich., Charles E. Kircher, Jr., Youngtown, Ariz., and Paul R. Pinchak, St. Clair Shores, Mich., assignors to Detrex Chemical Industries, Inc., Detroit, Mich.
No Drawing. Continuation-in-part of application Ser. No. 218,542, Jan. 17, 1972, which is a continuation-in-part of application Ser. No. 815,483, Apr. 11, 1969, now abandoned. This application June 8, 1972, Ser. No. 261,069
Int. Cl. C11d 7/52
U.S. Cl. 252—162                                   4 Claims

ABSTRACT OF THE DISCLOSURE

Methylchloroform compositions are provided which are stable in the presnece of metals, including aluminum, in either the anhydrous state or in the presence of water. The methylchloroform compositions of this invention contain pyrazine as the effective stabilizer. The compositions of this invention are useful in both liquid and vapor degreasing of metal and as a propellent for aerosol compositions.

CROSS REFERENCE OF RELATED APPLICATIONS

This application is continuation-in-part of copending divisional application Ser. No. 218,542, filed Jan. 17, 1972 which in turn is a continuation-in-part of application Ser. No. 815,483, filed Apr. 11, 1969, now abandoned.

BACKGROUND OF THE INVENTION

(1) Field of the invention

This invention is concerned with stabilized methylchloroform compositions.

(2) Background of the invention

Methylchloroform, also known as 1,1,1-trichlorethane, is used in industry as a liquid phase and vapor phase degreasing solvent to remove grease and oils from metal articles, and as a diluent for aerosol propellants. In these uses the methylchloroform comes into contact with a variety of metals and alloys. Methylchloroform is a relatively stable compound under most conditions. However, it is highly unstable, in the presence of certain metals especially virgin aluminum. A reaction occurs between anhydrous methylchloroform and, for example aluminum, even at ambient temperatures. This reaction, if allowed to go to completion, results in dissolution of the metal and extensive or even complete degradation of the methylchloroform.

The above described reaction between metals, and especially aluminum and methylchloroform is not typical of other chlorinated hydrocarbon solvents. The reaction is characterized by an immediate discoloration of the methylchloroform when it comes into contact with virgin aluminum. This reaction is referred to as "bleeding" because of the deep purple color which forms. The reaction between anhydrous methylchloroform and aluminum can be made to take place by simply scratching a piece of aluminum to expose unoxidized metal and immersing the exposed metal in anhydrous methylchloroform. As the reaction continues, the rate of reaction increases, acid fumes are relased and the aluminum suffers severe corrosion.

Because the reaction between the anhydrous methylchloroform and metals such as virgin aluminum is not typical of other chlorinated hydrocarbon solvents such as trichlorethylene and perchlorethylene, the chemical compounds which have been used to inhibit the decomposition of these other solvents are not effective in inhibiting the reaction of methylchloroform. This fact has been established in the methylchloroform inhibition prior art where, in U.S. Pats. 2,838,458, 2,970,113, 3,008,999, 3,049,571, 3,336,234, and 3,265,247—to cite a few—it is stated, "the inhibitors which are commercially effective with other chlorinated solvents are not satisfactory for methylchloroform"; and again, "generally speaking, the effectiveness of a particular inhibitor for a particular chlorinated solvent cannot be predicted," or again, "inhibitors which are very effective in stabilizing other chlorohydrocarbons are not effective as stabilizers for methylchloroform," or, ". . . methylchloroform presents its own unique difficulties regarding stabilization. Thus, experiences in the stabilization of other halogenated hydrocarbons are not applicable." Therefore, it is recognized in the art that the effectiveness of chemical compounds as inhibitors for the methylchloroform-virgin aluminum reaction cannot be predicted from their effectiveness as inhibitors in other chlorinated hydrocarbon solvents.

A number of compounds have been proposed to stabilize methylchloroform so as to permit the commercialization of methylchloroform as a degreasing solvent. An improved composition containing one such compound is the subject of copending application Ser. No. 754,997, filed Aug. 23, 1968, now abandoned.

In spite of efforts to make methylchloroform commercially useful, it has been found that in systems where water is present the methylchloroform is still unstable. The deleterious effect of water, especially when present in large enough amounts to exceed the solubility of water in methylchloroform, which is very low, is shown by the following observation. When a metal such as aluminum, having a protective oxide coating, is exposed to wet methylchloroform, which contains the suggested anhydrous methylchloroform stabilizer, at temperatures near the boiling point of the solvent, the aluminum will corrode to a gelatinous mass and the methylchloroform will become strongly acid. This is a reaction involving aluminum, water and methylchloroform which is entirely different from the well-known reaction between virgin aluminum and anhydrous methylchloroform described above.

In the industrial use of a chlorinated solvent such as methylchlorform, the seriousness of the corrosive action of methylchloroform and water on a metal such as aluminum is obvious when its is appreciated that the conventional operation of equipment in which the solvent is used does not prevent moisture from entering the system and dissolving in or saturating the solvent. As normally operated, machines in which hot methylchloroform is used are provided with water cooled condensing coils. In a humid atmosphere these coils, operated at a low enough temperature to condense solvent vapors, can also condense water out of the atmosphere. The chamber containing the condensed solvent vapors can, therefore, have free water floating on the surface of the liquid. Not only can water enter the system from the atmosphere, but at times the parts to be cleaned may be wet with water. Furthermore, it is necessary to reclaim degreasing solvents when the concentration of contaminants reaches a point where the solvent can no longer be used efficiently. In order to recover solvent with high yield and minimum thermal degradation, a direct steam distillation of most contaminated chlorinated hydrocarbon solvents is usually carried out. This technique, however, is not now used or recommended in the case of methylchloroform. The reason is that corrosion of metals is increased due to the increased amount of water in the solvent from the distillation process.

It can be seen therefore that methylchloroform, while being a highly effective solvent, has two distinct disadvantages. In the anhydrous form, it will readily react with virgin metal such as aluminum. In addition, when the solvent system contains water it will also react with metals even if they are initially protected with an oxide coating which would make them impervious to attack by anhydrous methylchloroform. The anhydrous reaction is, as noted above, completely different from the aqueous reaction. Typical commonly used compounds for stabilizing methylchloroform in the anhydrous state have not proven to be effective in preventing the aqueous reaction.

SUMMARY OF THE INVENTION

In accordance with this invention, methylchloroform compositions are provided which contain an effective amount of pyrazine sufficient to prevent the reaction of methylchloroform with metal, especially aluminum, both in the anhydrous state and in the presence of water.

DESCRIPTION OF THE PREFERRED EMBODIMENTS

It has been found that pyrazine is highly effective in preventing both reactions between methylchloroform and metal, in both the anhydrous state and in the presence of water.

For purposes of facilitating the explanation of this invention the term anhydrous reaction will be used to describe the reaction between methylchloroform which is either anhydrous or which contains minor amounts of water, such that the water is miscible with the methylchloroform. The anhydrous reaction is characterized by the purple "bleeding" which occurs when the anhydrous methylchloroform is brought into contact with virgin aluminum.

The aqueous reaction referred to hereinafter is the reaction which occurs between methylchloroform and a metal in a system which contains sufficient water that a separate water phase exists in the system, that is, the amount of water exceeds the miscibility limit of water in methylchloroform. The aqueous reaction is characterized by the formation of white gelatinous decomposition on the surface of a metal such as aluminum.

Pyrazine is also known as 1,4-diazine. It would be expected that the structurally similar compounds such as pyrimidine (1,3-diazine) and pyridazine (1,2-diazine) would react similar to pyrazine (1,4-diazine) in methylchloroform compositions. However, quite surprisingly it has been found that these closely related compounds are not particularly effective as stabilizers, especially in comparison to pyrazine.

Unsubstituted pyrazine is a highly effective stabilizer, and therefore lower amounts are required. In addition, pyrazine is a relatively low cost compound. The amount of pyrazine which is added to the methylchloroform composition is dependent upon the reaction condition under which the composition will be used. If the composition will be used for degreasing of active metals such as aluminum a higher amount should be employed. In addition, if the system is such that substantial amounts of water will be added to the composition during processing a higher amount of pyrazine should likewise be used.

The minimum amount required to be added can be defined as being an effective amount sufficient to prevent both the anhydrous and aqueous reaction of methylchloroform with the metal to be treated. In general, the maximum amount required in the most severe conditions is about 10% by weight of the pyrazine compound based on the total weight of the methylchloroform-pyrazine composition. In general, however, an amount of between 3–8% by weight of the methylchloroform provided quite adequate protection.

It has been found to be of some advantage to also include in the methylchloroform composition of this invention compounds heretofore suggested to prevent the anhydrous reaction of methylchloroform with metal. The preferred compound to be used as an additive for the purpose is a-trioxymethylene, which should be added at about 5% to obtain maximum protection in preventing the anhydrous reaction. When using a combination of a compound which prevents the anhydrous reaction such as a-trioxymethylene it is possible to use a considerably lesser amount of pyrazine. For example, when 5% a-trioxymethylene is used based on weight of the methylchloroform only 0.10–0.25% pyrazine is required to obtain a methylchloroform composition stable under both anhydrous and aqueous conditions.

The following examples are given by way of further illustration of the process of the present invention. These examples are not intended to limit the scope of the invention beyond the scope of the subjoined claims. All parts and percentages are parts and percentages by weight, not volume, unless otherwise noted.

EXAMPLE 1

Test for stability against anhydrous reaction

The effectiveness of a compound as a stabilizer to prevent the anhydrous methylchloroform-metal reaction may be evaluated by the scratch test. The scratch test is carried out as follows:

A water cooled coil of about 3 turns of ⅛ stainless steel tubing is suspended inside and just below the lip of a 200 ml. tall form beaker so that when solvent in the beaker is boiled, vapors rising from the boiling liquid are condensed on the coil and the condensate returned to the beaker. Thus, the solvent is kept under total reflux during the test period. To evaluate compounds as stabilizers for methylchloroform, a 1 inch square piece of Series 1100 aluminum is placed on the bottom of the beaker and then 100 mls. of methylchloroform containing the compound under test are placed in the beaker. Heat is applied and when the solvent has reached the boiling point, the aluminum piece is scratched with a carbide tipped scribe in a crosshatch pattern.

The effectiveness of the compound at the concentration used is determined by the extent of the reaction, if any, which occurs along the scratches.

The reaction between methylchloroform and virgin aluminum is accelerated by increase of temperature. Because of this temperature effect, some chemical compounds which appear to inhibit the reaction when the scratch test is carried out at room temperature, fail as inhibitors when the temperature is elevated to or near the boiling point of the methylchloroform. Therefore, it is desirable to carry out the scratch test with methylchloroform at or near the boiling point of the solvent as this is a more severe test than one run at room temperature. Under the conditions of the test if no reaction occurs within on hour, inhibition is established. Longer periods may be used, however, to evaluate degree of inhibition.

Test for stability against aqueous reaction

The corrosive effect of a methylchloroform composition and water on metals, especially aluminum, can be evaluated by the test procedure described below. This test simulates conditions which can occur in the commercial use of methylchloroform. 150 ml. of methylchloroform are placed in a 250 ml. conical Erlenmyer flask. (If an effective stabilizer for the reaction between virgin aluminum and anhydrous methyl chloroform is to be used, then 5% by weight of the inhibitor is incorporated into the solvent in the flask.) About 15 ml. of distilled water is added to the solvent in the flask to provide a reservoir of water during the test. A piece of aluminum (1100 series), 2" x ¾ x $1/16$", is placed in the flask so that it lays on the bottom of the flask in the solvent phase. (Care is taken to avoid scratching or otherwise penetrating the protective oxide coating on the aluminum and thus creating a virgin aluminum surface.) The flask is then attached to a water cooled glass condenser and placed in a constant temperature bath held at 65° C. The flask is kept in the bath until a heavy gelatinous coating is observed on the metal piece. Then the flask is removed, additional distilled water added, shaken and the water phase titrated with standard base to the end point of Bromthymol Blue. After the titration the residual metal piece, now free of the gelatinous coating, is observed for the extent of corrosion and may be weighed to determine the loss of metal.

This test procedure shows the unique and unexpected corrosive effect of methylchloroform and water on aluminum and indicates the seriousness of the problem created by this reaction.

Using the above procedures the results obtained using known compounds for controlling the reaction between virgin aluminum and methylchloroform and pyrazine were evaluated using the below tests for the anhydrous reaction and the aqueous reaction. The results are shown in Table 1.

TABLE 1

| Stabilizer in methylchloroform | Weight percent | Water added | Time of test hours | Developed acidity [1] | Percent metal lost [2] | Remarks |
|---|---|---|---|---|---|---|
| Anhydrous test ||||||| 
| None | | None | [3] 0.25 | | | Reaction starts almost immediately at several points and increases rapidly. After 5 min. reaction violent. Test stopped. Metal considerably attacked. Solvent dark purple. |
| 1,4 dioxane | 5 | do | 96 | None | 0 | Solvent clear. Metal unchanged. |
| a-Trioxymethylene | 5 | do | 96 | None | 0 | Do. |
| Pyrazine | 5 | do | 96 | None | 0 | Do. |
| None | | Free water present | 96 | 7,484 | 31.6 | Solvent slightly colored. Heavy gelatinous coating on metal. |
| 1,4 dioxane | 5 | do | 96 | 8,596 | 47.1 | Do. |
| a-Trioxymethylene | 5 | do | 96 | 8,048 | 37.1 | Do. |
| Pyrazine | 5 | do | 96 | 0 | 0 | Solvent clear. Metal unchanged. |

[1] Total acidity as p.p.m. of HCl referred to the weight of solvent.
[2] Aluminum tab 2" x ¾" x $1/16$" (1100 series) in each test.
[3] Test quenched and stopped at 15 mins.

EXAMPLE 2

In order to evaluate the effect of the aqueous reaction on different metals, methylchloroform containing only a conventional inhibitor against the anhydrous reaction was tested for its effect on different metals.

TABLE 2

Comparison of the corrosive effect of anhydrous stabilized methylchloroform and water on various metals

| Metal under test [1] | Time of test hours | Acidity developed [2] | Metal appearance |
|---|---|---|---|
| Steel | 48 | 248 | Corrosion apparent. |
| Brass | 48 | 257 | Copper showing on surface due to some dezincification. |
| Magnesium | 120 | 79 | Metal clean. No corrosion observed. |
| Aluminum | 36 | 2,047 | Heavy gelatinous coating—considerable metal attack. |

[1] Reservoir of free water over solvent as described above. Solvent used in each test: methylchloroform containing 5% by wt. 1,4 dioxane. Test carried out at 65° C.
[2] Total acidity as p.p.m. HCl referred to the weight of solvent.

It can be seen from Table 2 that aluminum is clearly the most seriously effected metal in the aqueous reaction. Accordingly, in the remainder of the tests aluminum was used as the standard test metal.

EXAMPLE 3

In order to show the unique problem encountered with methylchloroform as compared to other chlorinated hydrocarbon solvents, methylchloroform inhibited against the anhydrous reaction was tested against various other similar chlorinated hydrocarbons.

TABLE 3

Comparison of the corrosion of aluminum in various solvents and water

| Solvent used | Duration of test hours [1] | Acidity developed [2] | Percent metal lost [3] | Remarks |
|---|---|---|---|---|
| Inhibited methylchloroform [4] | 96 | 8,596 | 47.1 | Heavy gelatinous coating. |
| Ethylene dichloride | 120 | 134 | None | No apparent attack. |
| Perchlorethylene [5] | 120 | 0.0 | do | Metal clean. No attack. |
| Trichlorethylene [5] | 120 | 0.0 | do | Do. |
| Heptane | 120 | 0.0 | do | Do. |

[1] Test carried out at 65° C. Reservoir of free water in each test.
[2] Total acidity as p.p.m. HCl referred to the weight of solvent.
[3] Aluminum test piece (1100 series) 2" x ¾" x $1/16$".
[4] Inhibited with 5% by weight 1,4 dioxane.
[5] Commercial grade stabilized solvent.

EXAMPLE 4

In order to show the uniqueness of the pyrazine compound various other types of amines were evaluated as stabilizers for the aqueous reaction along with pyrazine. The results are show in Table 4.

TABLE 4
Effect of nitrogen compounds in controlling the corrosion of aluminum by inhibited methylchloroform and water

| Chemical added to inhibited methylchloroform [1] | Concentration of additive, wt. percent | Inhibition time, hours [2] |
|---|---|---|
| None | | 96 |
| Pyrazine (1,4 diazine) | 0.25 | 816 |
| Pyrimidine (1,3 diazine) | 0.25 | 216 |
| Pyridazine (1,2 diazine) | 0.25 | 240 |
| 2-methyl pyrazine | 0.25 | 144 |
| Unsyn. dimethylhydrazine | 0.25 | 376 |
| Methylene dimethylhydrazine | 0.25 | 160 |
| Tetramethylguanidine | 0.25 | 286 |
| Diisopropylamine | 0.10 | 142 |
| Do | 0.25 | 316 |
| Aminopyrazine | 0.25 | 648 |
| Imidazole | 0.25 | 64 |
| Ethylcyanate | 0.25 | 72 |
| Methylethyl ketoxime | 0.25 | 88 |
| Nitromethane | 0.25 | 88 |
| Dimethylformamide | 0.25 | 88 |
| Formamide | 0.25 | 88 |
| Acetonitrile | 0.25 | 18 |
| p-Phenylenediamine | 0.25 | 384 |
| m-Phenylenediamine | 0.25 | 384 |
| o-Phenylenediamine | 0.25 | 384 |
| n-Butylisocyanate | 0.25 | 64 |
| Triethylamine | 0.25 | 136 |
| 2-methoxy ethylamine | 0.25 | 408 |
| Pentylamines | 0.25 | 360 |
| Propylenediamine | 0.25 | 336 |
| 1,3-diaminobutane | 0.25 | 336 |

[1] Inhibited methychloroform contains 5% by weight a-trioxymethylene.
[2] Time in hours for the test to exhibit amount of metal corrosion, gelatinous coating and acidity development as test on inhibited methylchloroform containing no chemical additive.

EXAMPLE 5

Pyrazine was evaluated by itself at different weight percentages to determine its effectiveness as a stabilizer for the anhydrous reaction at high temperatures. The results are shown in Table 5 below.

TABLE 5
Inhibitor effect of pyrazine in scratch test at boiling point of methylchloroform

| Test No. | Weight percent pyrazine in methylchloroform | Duration of test | Observation, degree of inhibition [1] |
|---|---|---|---|
| 1 | None | 30 seconds | 5 |
| 2 | 0.4 | 3 minutes | 5 |
| 3 | 0.6 | do | 4 |
| 4 | 0.8 | 10 minutes | 3 |
| 5 | 1.0 | 1 hour | 3 |
| 6 | 1.2 | do | 2 |
| 7 | 1.5 | 6 hours | 2 |
| 8 | 2.0 | do | 1 |
| 9 | 2.5 | do | 1 |
| 10 | 5.0 | do | 1 |
| 11 | 10.0 | do | 1 |

[1] Degree of inhibition is reported numerically; the significance of these numbers is as follows:
1. No reaction at scratch. No solvent discoloration. Complete inhibition shown.
2. Reaction appears to start at several isolated spots along scratches but is immediately stopped by a "healing" process. Solvent remains clear and colorless or nearly so.
3. Some reaction which slows down as it proceeds due to "coking" or solid formation at the scratch. No bleeding but some solvent discoloration may appear.
4. Reaction along the scratch starts and continues slowly. Some bleeding occurs.
5. Immediate reaction at the scratch with bleeding and rapid darkening of the solvent. After a short time fumes develop, temperature increases and reaction becomes violent. No inhibition.

Thus, while a little as 1.0% by weight or less can be used with considerable effect, a preferred concentration would be about 2.0% or more of pyrazine in methylchloroform. It is possible to use as much as 10.0% by weight as a measure of safety. However, large amounts add to the cost of inhibition. A preferred range is between 3.0 and 8.0% by weight of pyrazine in methylchloroform.

We claim:

1. A composition of matter consisting essentially of methylchloroform and an effective amount of pyrazine, said effective amount being an amount sufficient to stabilize said composition from reacting with metals in an anhydrous system and in an aqueous system.

2. The composition of matter according to claim 1 which contains as the effective amount of pyrazine from about 0.1–10% by weight based on weight of the methylchloroform.

3. The composition of matter according to claim 1 which contains from about 3–8% by weight of pyrazine.

4. The composition of matter according to claim 1 containing about 0.10–0.25% by weight of pyrazine and about 5% by weight of a-trioxymethylene.

References Cited

UNITED STATES PATENTS

| 2,043,258 | 6/1936 | Missbach | 260—652.5 |
| 2,043,259 | 6/1936 | Missbach | 260—652.5 |

FOREIGN PATENTS

| 624,416 | 11/1962 | Belgium | 260—652.5 |

WILLIAM E. SCHULZ, Primary Examiner

U.S. Cl. X.R.

252—171; 260—652.5